United States Patent
Park

(10) Patent No.: US 12,112,557 B2
(45) Date of Patent: Oct. 8, 2024

(54) METHOD AND SYSTEM FOR PROCESSING CAPTURED IMAGE DATA OF A MICROBIAL CULTURE MEDIUM AND RECOGNIZING COLONY FORMING UNIT (CFU) FROM THE CAPTURED IMAGE DATA USING PRE-LEARNED DEEP LEARNING MODEL

(71) Applicant: ByoungJin Park, Seoul (KR)

(72) Inventor: ByoungJin Park, Seoul (KR)

(*) Notice: Subject to any disclaimer, the term of this patent is extended or adjusted under 35 U.S.C. 154(b) by 398 days.

(21) Appl. No.: 17/390,000

(22) Filed: Jul. 30, 2021

(65) Prior Publication Data

US 2022/0253627 A1 Aug. 11, 2022

(30) Foreign Application Priority Data

Feb. 5, 2021 (KR) .................... 10-2021-0016785

(51) Int. Cl.
*G06T 7/00* (2017.01)
*G06T 3/147* (2024.01)
(Continued)

(52) U.S. Cl.
CPC ............ *G06V 20/695* (2022.01); *G06T 3/147* (2024.01); *G06T 3/40* (2013.01); *G06T 5/20* (2013.01);
(Continued)

(58) Field of Classification Search
CPC .... G06V 20/695; G06V 20/69; G06T 3/0075; G06T 3/40; G06T 5/009; G06T 5/20;
(Continued)

(56) References Cited

U.S. PATENT DOCUMENTS

| | | | |
|---|---|---|---|
| 2013/0109051 A1* | 5/2013 | Li | G06T 7/0012 435/288.7 |
| 2013/0183707 A1* | 7/2013 | Mangoubi | G16B 40/20 702/19 |
| 2020/0034666 A1* | 1/2020 | Yun | G06F 18/214 |

FOREIGN PATENT DOCUMENTS

| | | |
|---|---|---|
| KR | 10-2013-0038334 A | 4/2013 |
| KR | 10-1924285 * | 11/2018 |

(Continued)

OTHER PUBLICATIONS

Office Action Report of the corresponding Korean Application No. 10-2021-0016785 dated Apr. 15, 2022.
(Continued)

*Primary Examiner* — Ping Y Hsieh
(74) *Attorney, Agent, or Firm* — Knobbe, Martens, Olson & Bear, LLP

(57) ABSTRACT

This application relates to a method for processing image data of a microbial culture medium to recognize colony forming unit (CFU). In one aspect, the method includes receiving, at a processor, captured image data of the microbial culture medium from a user device, and preprocessing, at the processor, the captured image data. The method may also include counting, at the processor, the number of CFUs included in the preprocessed image data to derive result data including the counted number of CFUs. The method may further include automatically inputting information included in the result data into a predetermined template to generate document data corresponding to the captured image data, and transmitting at least one of the result data or the document data to the user device.

20 Claims, 13 Drawing Sheets

(51) Int. Cl.
  *G06T 3/40* (2006.01)
  *G06T 5/20* (2006.01)
  *G06T 5/92* (2024.01)
  *G06V 20/69* (2022.01)

(52) U.S. Cl.
  CPC .............. *G06T 5/92* (2024.01); *G06T 7/0012* (2013.01); *G06T 2207/10056* (2013.01); *G06T 2207/30242* (2013.01)

(58) Field of Classification Search
  CPC ......... G06T 7/0012; G06T 2207/10056; G06T 2207/30242; G06T 2207/20084; G06T 2207/30024; G06T 5/002; G06N 3/04; G06N 3/082
  See application file for complete search history.

(56) References Cited

FOREIGN PATENT DOCUMENTS

KR     10-1924285 B1    11/2018
KR  10-2020-0017573 A     2/2020

OTHER PUBLICATIONS

Notice of Allowance Report of the corresponding Korean Application No. 10-2021-0016785 dated Aug. 30, 2022.

\* cited by examiner

FIG. 12
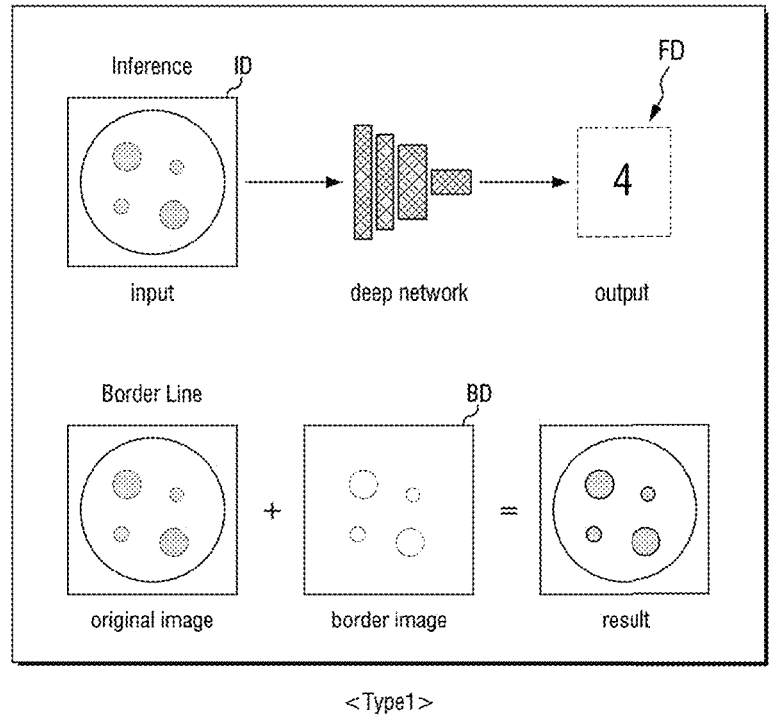
<Type1>
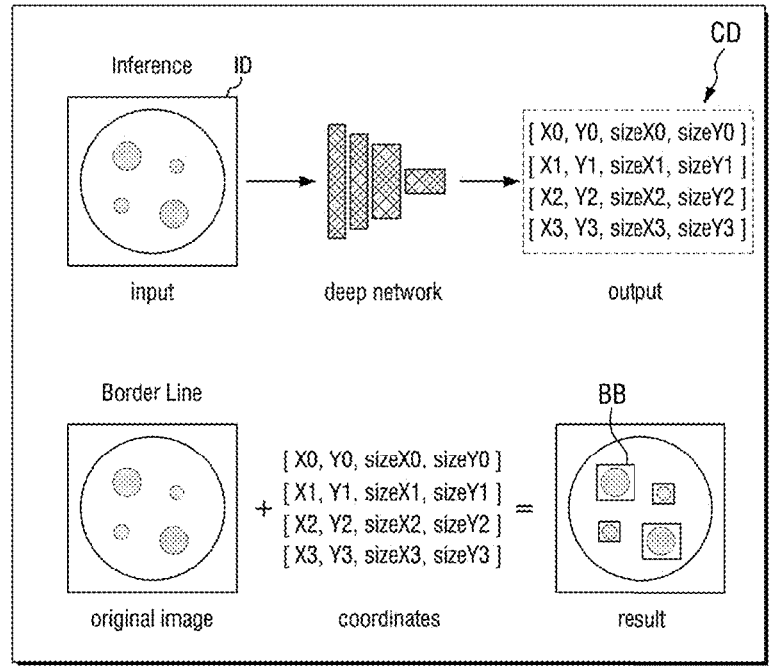
<Type2>

METHOD AND SYSTEM FOR PROCESSING CAPTURED IMAGE DATA OF A MICROBIAL CULTURE MEDIUM AND RECOGNIZING COLONY FORMING UNIT (CFU) FROM THE CAPTURED IMAGE DATA USING PRE-LEARNED DEEP LEARNING MODEL

CROSS-REFERENCE TO RELATED APPLICATION

This application claims priority from Korean Patent Application No. 10-2021-0016785 filed on Feb. 5, 2021 in the Korean Intellectual Property Office, and all the benefits accruing therefrom under 35 U.S.C. 119, the contents of which in its entirety are herein incorporated by reference.

BACKGROUND

Field

The described technology generally relates to a method for colony forming unit (CFU) recognition for preprocessing image data received via a user device, and deriving result data suitable for a user by using a plurality of pre-learned deep learning models.

Description of the Related Technology

What is set forth in this section merely provides background information on the present embodiments and does not constitute the prior art.

Recently, there has been an increase in the use of a laboratory information management system (hereinafter, LIMS), which is a system that can store information generated or used in a laboratory, manage the stored data, and check and utilize it in a format desired by a user.

SUMMARY

One aspect is a method for CFU recognition that can secure the accuracy and integrity of CFU counting using a pre-learned deep learning model.

Another aspect is a method for CFU recognition that can improve the accuracy and integrity of CFU counting by subjecting a plurality of deep learning models to learning through a preprocessing process of captured images and a data augmentation process.

Another aspect is a method for CFU recognition that can automatically input result data including the number of CFUs counted into a template and can electronically document them.

The objects of the described technology are not limited to those mentioned above, and other objects and advantages of the described technology that have not been mentioned can be understood by the following description, and will be more clearly understood by embodiments of the described technology. In addition, it will be readily appreciated that the objects and advantages of the described technology can be realized by the means and combinations thereof set forth in the claims.

Another aspect is a method for processing image data of a microbial culture medium to recognize colony forming unit (CFU), the method comprising: receiving, at a processor, captured image data of the microbial culture medium from a user device; preprocessing, at the processor, the captured image data, the preprocessing comprising one or more of: adjusting a size of the captured image data, adjusting a brightness and shading of the captured image data to be within a predetermined range, or filtering the captured image data using a filter stored in a memory; counting, at the processor, the number of CFUs included in the preprocessed image data, the counting comprising: receiving a plurality of pre-learned deep learning models, inputting the preprocessed image data into the plurality of pre-learned deep learning models, and deriving respective intermediate data for the plurality of pre-learned deep learning models, and comparing the respective intermediate data with each other and deriving result data, the result data including the counted number of CFUs; automatically inputting information included in the result data into a predetermined template to generate document data corresponding to the captured image data; and transmitting at least one of the result data or the document data to the user device.

In the above method, the result data comprises at least one of the following: count data obtained by counting the counts of colonies formed in the microbial culture medium; coordinate data indicating locations where the colonies are formed in the microbial culture medium; or boundary data indicating boundaries of the colonies in the microbial culture medium. In the above method, the plurality of pre-learned deep learning models receive the preprocessed image data as an input, and provide the count data or the coordinate data as an output thereof. In the above method, each of the plurality of pre-learned deep learning models comprises: an input layer that uses the preprocessed image data as an input node; an output layer that uses the count data or the coordinate data as an output node; and one or more hidden layers arranged between the input layer and the output layer, and wherein weights of nodes and edges between the input node and the output node are updated by a learning process of the plurality of pre-learned deep learning models.

The above method further comprises one or more of the following: overlapping boundaries of the colonies included in the boundary data onto the image for the microbial culture medium, and displaying them on a screen of the user device; or overlapping a bounding box created based on the coordinate data onto the image for the microbial culture medium, and displaying it on the screen of the user device.

The above method further comprises: subjecting the plurality of pre-learned deep learning models to learning, wherein the subjecting comprises: receiving the result data corresponding to the captured image data; generating augmented image data by using one or more image transformation processes, based on the preprocessed image data; and subjecting the plurality of pre-learned deep learning models to learning by using learning data including the preprocessed image data, the augmented image data and the result data.

The above method further comprises: storing the learning data in an information collection memory; and storing the plurality of pre-learned deep learning models that have been subjected to learning based on the learning data, in a deep learning memory, wherein the counting comprises: deriving the number of the CFUs using one or more of the plurality of pre-learned deep learning models stored in the deep learning memory. In the above method, the one or more transformation processes comprise at least one of: rotation, inversion, symmetry, or transformation of the preprocessed image data.

Another aspect is a system for processing image data of a microbial culture medium to recognize colony forming unit (CFU), the system comprising: a preprocessing processor configured to receive and preprocess captured image data of the microbial culture medium from a user device, the preprocessing processor further configured to one or more of: adjust a size of the captured image data, adjust a brightness and shading of the captured image data to be within a predetermined range, or filter the captured image data using a filter stored in a memory; and a CFU counting processor configured to count the number of CFUs included in the preprocessed image data, the CFU counting processor further configured to: receive a plurality of pre-learned deep learning models; input the preprocessed image data into the plurality of pre-learned deep learning models, and derive respective intermediate data for the plurality of pre-learned deep learning models; compare the respective intermediate data with each other and derive result data, the result data including the counted number of CFUs; automatically input information included in the result data into a predetermined template to generate document data corresponding to the captured image data; and transmit at least one of the result data or the document data to the user device.

In the above system, the result data comprises at least one of the following: count data obtained by counting the counts of colonies formed in the microbial culture medium; coordinate data indicating locations where the colonies are formed in the microbial culture medium; or boundary data indicating boundaries of the colonies in the microbial culture medium. In the above system, the plurality of pre-learned deep learning models receive the preprocessed image data as an input, and provide the count data or the coordinate data as an output thereof. The above system further comprises a learning processor configured to: receive the result data corresponding to the captured image data; generate augmented image data by using one or more image transformation processes, based on the preprocessed image data; and subject the plurality of pre-learned deep learning models to learning by using learning data including the preprocessed image data, the augmented image data and the result data.

The above system further comprises: an information collection memory configured to store the learning data; and a deep learning memory configured to store the plurality of pre-learned deep learning models that have been subjected to learning based on the learning data stored in the information collection memory, the CFU counting processor further configured to derive the number of the CFUs using one or more of the plurality of pre-learned deep learning models stored in the deep learning memory. In the above system, the one or more transformation processes comprise at least one of: rotation, inversion, symmetry, or transformation of the preprocessed image data.

Another aspect is a non-transitory computer readable medium storing instructions, when executed by one or more processors, configured to perform a method for processing image data of a microbial culture medium to recognize colony forming unit (CFU), the method comprising: receiving, at a processor, captured image data of the microbial culture medium from a user device; preprocessing, at the processor, the captured image data, the preprocessing comprising one or more of: adjusting a size of the captured image data, adjusting a brightness and shading of the captured image data to be within a predetermined range, or filtering the captured image data using a filter stored in a memory; counting, at the processor, the number of CFUs included in the preprocessed image data, the counting comprising: receiving a plurality of pre-learned deep learning models, inputting the preprocessed image data into the plurality of pre-learned deep learning models, and deriving respective intermediate data for the plurality of pre-learned deep learning models, and comparing the respective intermediate data with each other and deriving result data, the result data including the counted number of CFUs; automatically inputting information included in the result data into a predetermined template to generate document data corresponding to the captured image data; and transmitting at least one of the result data or the document data to the user device.

In the above medium, the result data comprises at least one of the following: count data obtained by counting the counts of colonies formed in the microbial culture medium; coordinate data indicating locations where the colonies are formed in the microbial culture medium; or boundary data indicating boundaries of the colonies in the microbial culture medium.

In the above medium, each of the plurality of pre-learned deep learning models comprises: an input layer that uses the preprocessed image data as an input node; an output layer that uses the count data or the coordinate data as an output node; and one or more hidden layers arranged between the input layer and the output layer, and wherein weights of nodes and edges between the input node and the output node are updated by a learning process of the plurality of pre-learned deep learning models.

In the above medium, the method further comprises one or more of the following: overlapping boundaries of the colonies included in the boundary data onto the image for the microbial culture medium, and displaying them on a screen of the user device; or overlapping a bounding box created based on the coordinate data onto the image for the microbial culture medium, and displaying it on the screen of the user device.

In the above medium, the method further comprises: subjecting the plurality of pre-learned deep learning models to learning, wherein the subjecting comprises: receiving the result data corresponding to the captured image data; generating augmented image data by using one or more image transformation processes, based on the preprocessed image data, wherein the one or more transformation processes comprise at least one of: rotation, inversion, symmetry, or transformation of the preprocessed image data; and subjecting the plurality of pre-learned deep learning models to learning by using learning data including the preprocessed image data, the augmented image data and the result data.

In the above medium, the method further comprises: storing the learning data in an information collection memory; and storing the plurality of pre-learned deep learning models that have been subjected to learning based on the learning data, in a deep learning memory, wherein the counting comprises deriving the number of the CFUs using one or more of the plurality of pre-learned deep learning models stored in the deep learning memory.

The method for CFU recognition of the described technology may perform CFU counting using a pre-learned deep learning model. As a result, the described technology can increase the accuracy of CFU counting and reduce the time required for CFU recognition.

In addition, the method for CFU recognition of the described technology can increase the accuracy and integrity of CFU counting by comparing the results of a plurality of different deep learning models with each other.

Moreover, the method for CFU recognition of the described technology can shorten the time needed to organize the result data into a document by automating the process of inputting the result data including the number of CFUs counted in the method described above into a template and electronically documenting them. As a result, the described technology can process a large amount of experimental data quickly, shorten the time required for the experiment, and consequently improve the convenience for users.

In addition to what has been described, specific effects of the described technology will be described together while describing specific details for carrying out the described technology.

BRIEF DESCRIPTION OF THE DRAWINGS

FIG. 12 is a diagram for illustrating result data in accordance with some embodiments of the described technology.

DETAILED DESCRIPTION

Figure 1:
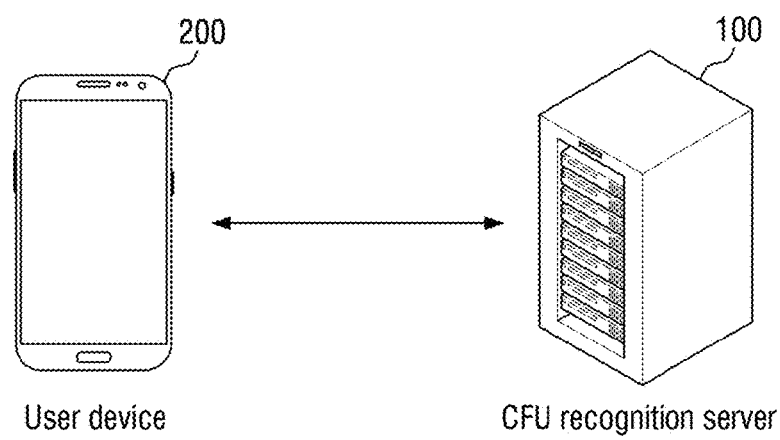
FIG. 1 is a conceptual diagram for illustrating a system for performing a method for CFU recognition in accordance with an embodiment of the described technology.

LIMS technology is implemented by being integrated with various technical fields, and there is an increasing need for quality assurance systems that ensure data integrity through the automation of test processes that are qualitative and are conducted manually in microbial testing. For instance, in the above microbial test method, since the steps of taking a photograph of a microbial culture medium, indicating a mark on the captured image, inserting the corresponding photograph into a predefined template, and performing payment are carried out manually, there were limitations in that data integrity was not guaranteed and data collection speed was low.

Accordingly, a method for CFU recognition that extracts image data from a microbial culture medium using LIMS technology and automatically counts the number of colony-forming units (hereinafter, CFUs) has been used recently.

However, as the method for CFU recognition takes a method of using the topological difference between the microbial culture medium and the colonies, there was a problem of the accuracy of CFU recognition being lowered. Therefore, there has been a need for a system that increases the accuracy of CFU recognition and automatically documents the result data.

The terms or words used in the present description and the claims should not be construed as limited to their ordinary or lexical meanings. They should be construed as the meaning and concept in line with the technical idea of the described technology based on the principle that the inventor can define the concept of terms or words in order to describe his/her own inventive concept in the best possible way. Further, since the embodiment described herein and the configurations illustrated in the drawings are merely one embodiment in which the described technology is realized and do not represent all the technical ideas of the described technology, it should be understood that there may be various equivalents, variations, and applicable examples that can replace them at the time of filing this application.

Although terms such as first, second, A, B, etc. used in the present description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the described technology. The term 'and/or' includes a combination of a plurality of related listed items or any item of the plurality of related listed items.

The terms used in the present description and the claims are merely used to describe particular embodiments and are not intended to limit the described technology. Singular expressions include plural expressions unless the context explicitly indicates otherwise. In the present application, terms such as "comprise," "have," etc. should be understood as not precluding the possibility of existence or addition of features, numbers, steps, operations, components, parts, or combinations thereof described herein.

Unless defined otherwise, all terms used herein, including technical or scientific terms, have the same meaning as commonly understood by those of ordinary skill in the art to which the described technology pertains.

Terms such as those defined in commonly used dictionaries should be construed as having a meaning consistent with the meaning in the context of the relevant art, and are not to be construed in an ideal or excessively formal sense unless explicitly defined in the present application. In addition, each configuration, procedure, process, method, or the like included in each embodiment of the described technology may be shared to the extent that they are not technically contradictory to each other.

In the following, a method for CFU recognition and a CFU recognition system for performing the same in accordance with some embodiments of the described technology will be described in detail, with reference to FIGS. 1 to 15.

FIG. 1 is a conceptual diagram for illustrating a CFU recognition system for performing a method for CFU recognition in accordance with an embodiment of the described technology.

Referring to FIG. 1, the CFU recognition system in accordance with some embodiments of the described technology may comprise a CFU recognition server 100 and a user device 200.

The CFU recognition server 100 (hereinafter, the server) and the user device 200 may be implemented as a server-client system. In this case, the server 100 may select one or more deep learning models DL, and provide result data or document data derived based on the data outputted from the deep learning model DL to the user device 200. The server 100 may send and receive data to and from the user device 200 via a wired or wireless network.

Specifically, the server 100 may preprocess data of each user using a big data analysis technique based on the data received from each user device 200, and through this, count the number of CFUs included in the data. Further, in order to provide result data RD including the number of CFUs, a deep learning model DL suitable for data analysis may be selected and used.

In this process, the server 100 may count the number of CFUs using a deep learning model TL that has been subjected to learning based on learning data TD composed of a plurality of user data, and may provide the result corresponding thereto.

A specific description of the deep learning model will be described later in detail with reference to FIGS. 4 to 11.

The server 100 may be a performer of the method for CFU recognition in accordance with some embodiments of the described technology. Specifically, the server 100 may receive image data ID from the user device 200. In this case, the image data ID may include images and information of a microbial culture medium.

Next, the server 100 may select a deep learning model DL suitable for the user by using the image data ID received, and provide the result data RD derived using this to the user device 200.

In this case, a dedicated application used to communicate with the server 100 may be installed in the user device 200. Via the dedicated application installed in the user device 200, the user may transmit the image data ID or receive and display the result data RD.

In addition, the method for CFU recognition of the described technology may be performed only on the server 100, or respective steps may be divided into and implemented by the server 100 and the user device 200. However, the description will be provided on the assumption that the method for CFU recognition is performed in the server 100 in the following for the convenience of description.

In some embodiments of the described technology, the user device 200 may refer to at least one of various electronic devices such as a personal computer (PC), a laptop computer, a tablet, a mobile phone, a smartphone, a wearable device (e.g., a watch-type terminal), etc.

Further, the user device 200 may include an input unit configured to receive a user input, a display unit configured to display visual information, a communication unit configured to transmit and receive signals to and from the outside, and a control unit configured to process data, control the respective units inside the user device 200, and control data transmission/reception between the units. In the following, what the control unit performs inside the user device 200 according to the commands of the user is collectively referred to as being performed by the user device 200.

Meanwhile, the server 100 is a computer system that provides information or services to the user device 200 through a communication network and may refer to a computer program or device.

In addition, the server 100 of the described technology may be directly operated or managed by a particular company or individual, or may be outsourced, and may be operated by the same entity.

Furthermore, since the name of the server 100 is not specified, functions performed by a certain server may also be performed by other servers, and as a matter of course, functions performed by one server may be performed separately by a plurality of servers.

In the following, a method for CFU recognition in accordance with some embodiments of the described technology will be discussed in detail.

Figure 2:
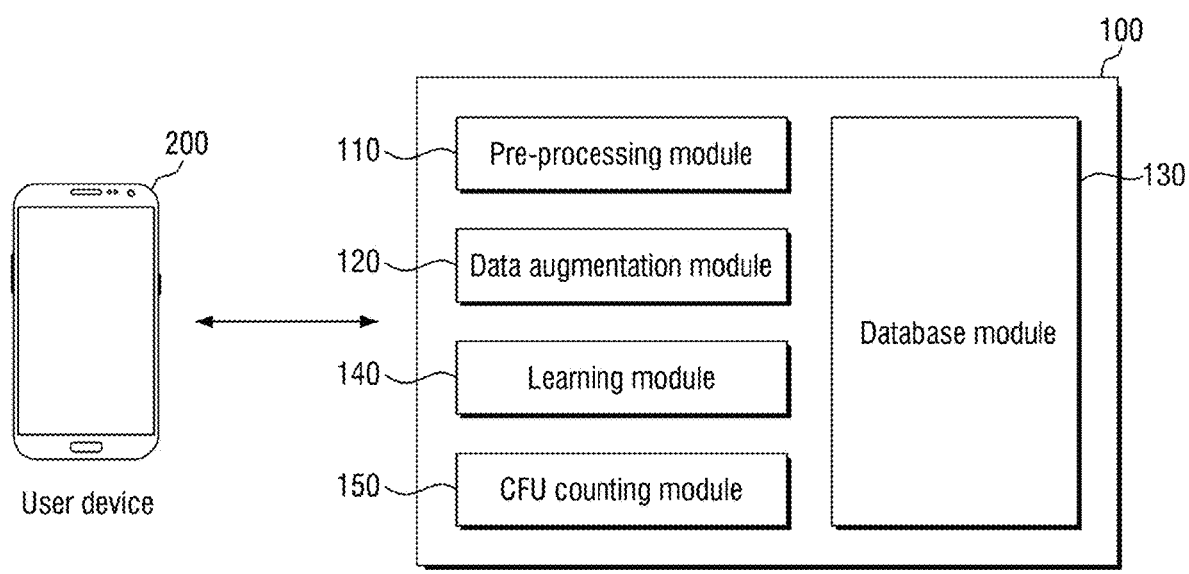
FIG. 2 is a block diagram for illustrating the components of the system for performing a method for CFU recognition of FIG. 1.
Figure 3:
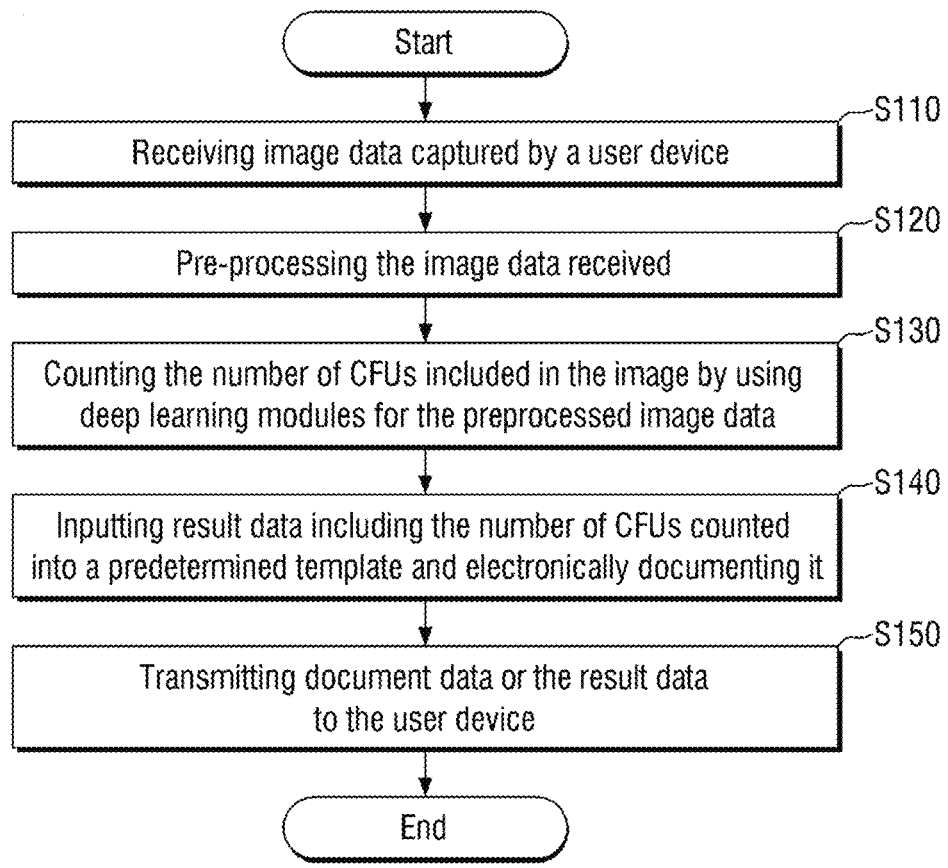
FIG. 3 is a flowchart for illustrating a method for CFU recognition in accordance with an embodiment of the described technology.
Figure 4:
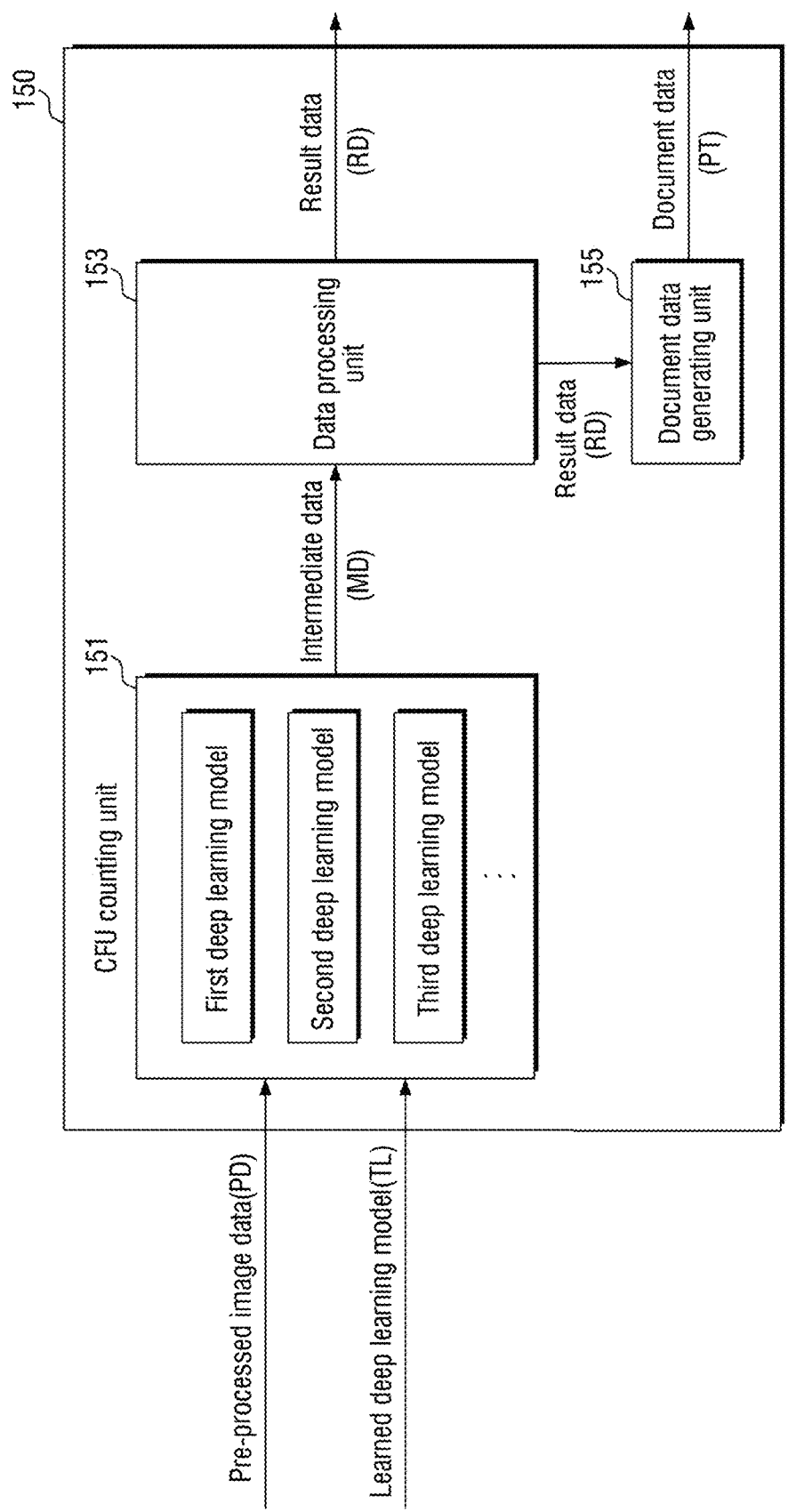
FIG. 4 is a view for illustrating a CFU counting module of FIG. 2.
Figure 5:
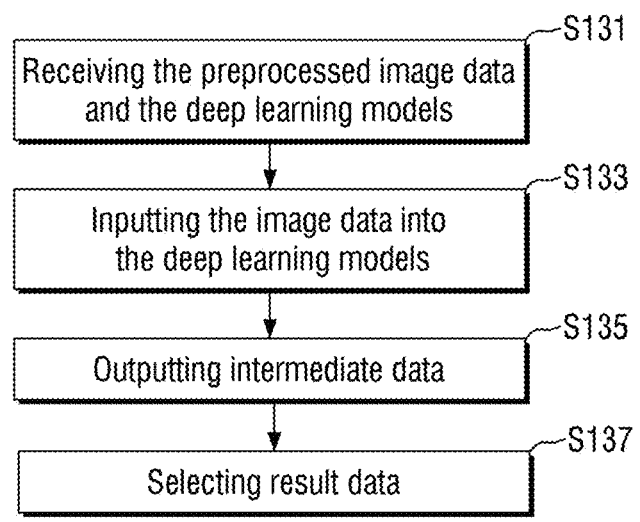
FIG. 5 is a flow chart for illustrating some examples of a step of counting the number of CFUs of FIG. 3.

FIG. 2 is a block diagram for illustrating the components of the system for performing a method for CFU recognition of FIG. 1. FIG. 3 is a flowchart for illustrating a method for CFU recognition in accordance with an embodiment of the described technology. FIG. 4 is a view for illustrating a CFU counting module of FIG. 2. FIG. 5 is a flow chart for illustrating some examples of a step of counting the number of CFUs of FIG. 3.

First, referring to FIGS. 2 and 4, the server 100 of the system that performs the method for CFU recognition in accordance with an embodiment of the described technology may include a preprocessing module (or a preprocessing processor) 110, a data augmentation module (or a data augmentation processor) 120, a database module (or a database) 130, a learning module (or a learning processor) 140, and a CFU counting module (or a CFU counting processor) 150.

The preprocessing module 110 may receive image data ID for a microbial culture medium captured by the user device 200. The preprocessing module 110 may perform preprocessing using the received image data ID.

Figure 6:
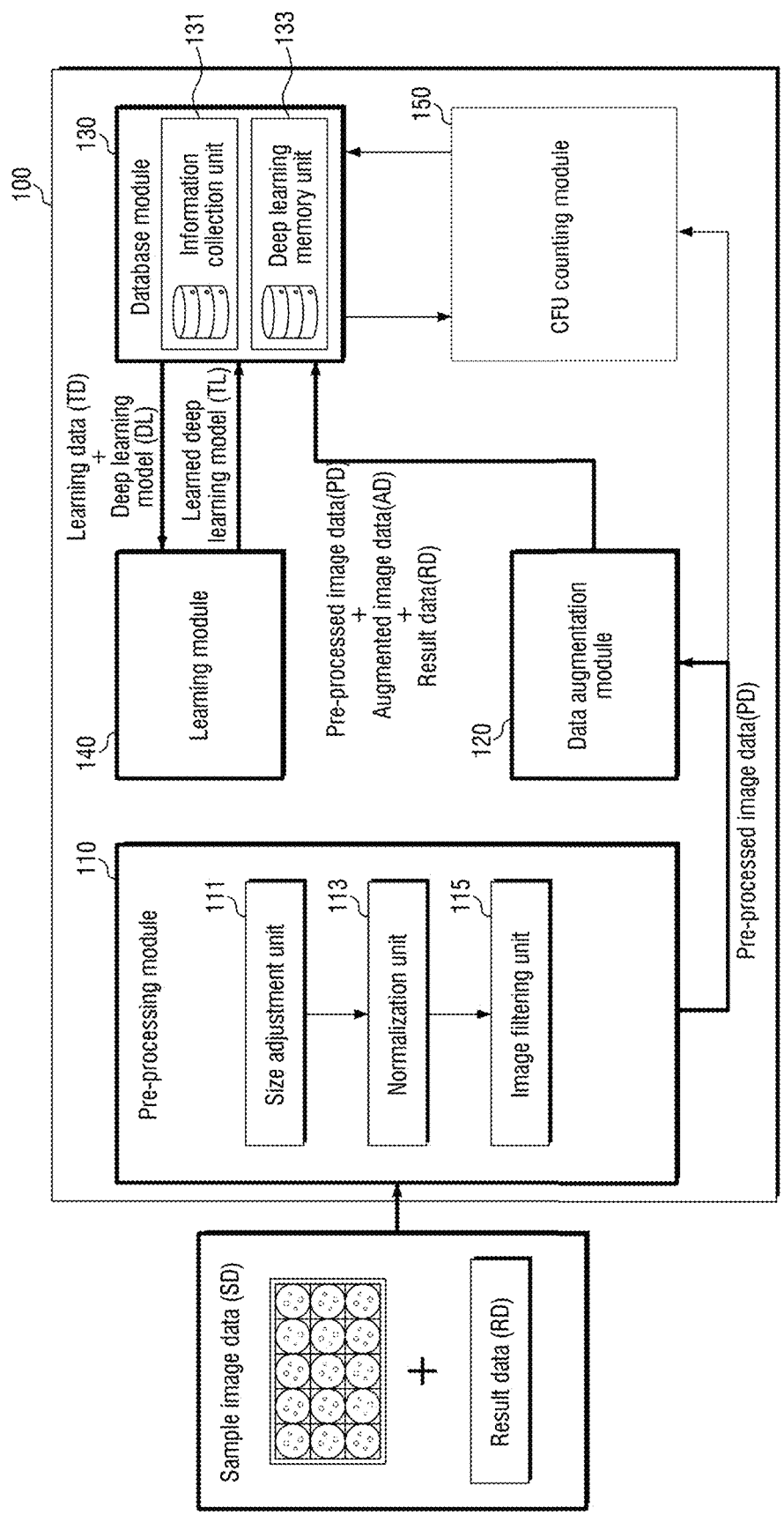
FIG. 6 is a block diagram for illustrating a learning step of a deep learning model in a method for CFU recognition in accordance with an embodiment of the described technology.

Specifically, referring to FIG. 6, the preprocessing module 110 may include a size adjustment unit 111, a normalization unit 113, and an image filtering unit 115.

The size adjustment unit 111 may adjust the size of the image data ID. That is, the size adjustment unit 111 may adjust the image data ID to conform to a preset size. The image data ID received from the user device 200 may have various sizes. Therefore, the size adjustment unit 111 may convert the size of the image data ID into a preset size so that the size is constant.

The normalization unit 113 may adjust the brightness and shade of the image data ID to be within a predetermined range. For example, as the image data ID received from the user device 200 have been captured in different photographing environments, the brightness may be uneven or the image may include shades. Accordingly, the normalization unit 113 may adjust the image data ID so that the brightness and shade of the image data ID are within a preset range. However, the present embodiment is not limited thereto, and may also adjust the contrast, saturation, color, etc. of the image data ID, as a matter of course.

Further, the normalization unit 113 may normalize the image data ID by using a Gaussian filter. However, the filter and the normalization method used in the normalization unit 113 may be modified and implemented in various ways, as a matter of course.

The image filtering unit 115 may filter the image data ID by using a filter stored in advance. The filter used in the image filtering unit 115 may include a Gaussian filter, a binarization filter, a distance transformation filter, a watershed segmentation filter, a cleaning filter, a color filter, or the like.

For example, the image filtering unit 115 may apply a color filter to the image data ID to increase the color contrast of the image data ID, and based on this, clearly derive the boundary line between the CFU and the culture solution. In addition, the image filtering unit 115 may derive a boundary image BD, which will be described later, by using a plurality of filters.

However, the contents related to the filter described above are merely some examples of the described technology, and of course, various filters capable of filtering the image data ID may be used in the described technology.

The preprocessing module 110 may select and use some of the respective components described above. For example, the image data ID may be adjusted in brightness and shade to be within a predetermined range by the normalization unit 113. In this case, the size of the image data ID may not be adjusted by the size adjustment unit 111. However, this is merely an example, and the described technology is not limited thereto.

The data augmentation module 120 may receive the image data PD preprocessed by the preprocessing module 110. The data augmentation module 120 may generate augmented image data AD using one or more transformation processes based on the preprocessed image data PD.

The data augmentation module 120 may generate one or more pieces of augmented image data AD using various transformation processes such as rotation, inversion, symmetry, and transformation based on the preprocessed image data PD. That is, the data augmentation module 120 performs the function of expanding the received image in order to increase the amount of learning data for subjecting deep learning models to learning. Therefore, the data augmentation module 120 may be used in the learning step of the deep learning model.

The database module 130 may include an information collection unit (or an information collection memory) 131 and a deep learning memory unit (or a deep learning memory) 133. The information collection unit 131 may store various data received from the data augmentation module 120. In this case, the account of the user may be separated and the data related to that user may be stored and managed.

The deep learning memory unit 133 may store deep learning models DL used for machine learning and learned deep learning models TL by the learning data TD.

In this case, the learned deep learning models TL may generate result data RD for the image data ID by using artificial neural networks subjected to learning based on big data.

To describe in more detail, a deep learning technique, which is a type of machine learning, goes down to a deep level in multiple stages based on data and is subjected to learning.

Deep learning refers to a set of machine learning algorithms that extract core data from a plurality of data while going up the levels.

The deep learning models may use a variety of known deep learning structures. For example, the deep learning models may use structures such as a convolutional neural network (CNN), a recurrent neural network (RNN), a deep belief network (DBN), or a graph neural network (GNN).

Specifically, a CNN (convolutional neural network) is a model that imitates the function of the human brain, created based on the assumption that when a person recognizes an object, s/he extracts basic features of the object, then performs complex calculations in the brain, and based on the results, recognizes the object.

An RNN (recurrent neural network) is widely used for natural language processing, etc., is a structure effective in processing time-series data that change over time, and is capable of constructing an artificial neural network structure by stacking layers at every moment.

A DBN (deep belief network) is a deep learning structure constructed by stacking a restricted Boltzmann machine (RBM), which is a deep learning technique, in multiple layers. When a certain number of layers are obtained by repeating restricted Boltzmann machine (RBM) learning, a DBN (deep belief network) having the corresponding number of layers may be constructed.

A GNN (graphic neural network; hereinafter, GNN) represents an artificial neural network structure implemented in a way that derives a similarity and feature points between modeling data, by using the modeling data modeled based on data mapped between particular parameters.

On the other hand, artificial neural network learning of the deep learning models may be achieved by adjusting the weight of a connection line between nodes (and also adjusting a bias value if necessary) so that a desired output is obtained for a given input. In addition, the artificial neural network may continuously update the weight value by learning.

In this case, both unsupervised learning and supervised learning may be used as the machine learning method of the artificial neural network. In addition, the deep learning models may be controlled to automatically update the artificial neural network structure for outputting count data FD or coordinate data CD after learning according to settings.

The learning module 140 may perform a learning operation of an artificial neural network based on machine learning using the learning data TD as input data. In other words, the learning module 140 may train the deep learning models DL stored in the deep learning memory unit 133, based on the learning data TD stored in the information collection unit 131. The learned deep learning model TL trained in the learning module 140 may be transferred back to the deep learning memory unit 133, so as to be stored separately or to update an existing model.

On the other hand, referring to FIG. 4, the CFU counting module 150 may include a CFU counting unit 151, a data processing unit 153, and a document data generating unit 155.

The CFU counting unit 151 may receive the preprocessed image data PD and a plurality of learned deep learning models TL. At this time, the CFU counting unit 151 may input the preprocessed image data PD into the plurality of learned deep learning models TL.

For example, the CFU counting unit 151 may input the preprocessed image data PD into a first deep learning model, a second deep learning model, and a third deep learning model. Next, the CFU counting unit 151 may collect respective result values for the first deep learning model, the second deep learning model, and the third deep learning model, and derive intermediate data MD.

Next, the data processing unit 153 may receive the intermediate data MD from the CFU counting unit 151. The data processing unit 153 may compare the result values for the respective deep learning models included in the intermediate data MD with each other, and derive result data RD. For example, the data processing unit 153 determines whether the result values outputted from the respective deep learning models are all identical or different from one another. Next, if the respective result values are different from one another, the data processing unit 153 may select a result value that satisfies a preset condition and may derive it as result data RD. At this time, the conditions used for selecting the result data RD may be modified and implemented in various ways, of course.

The result data RD may include at least one of count data FD, coordinate data CD, and boundary data BD. Here, the count data FD refer to the data obtained by counting the counts of the colonies formed in a microbial culture medium, the coordinate data CD refer to the data indicating the locations where the colonies are formed in the microbial culture medium, and the boundary data BD refer to the data indicating the boundaries of the colonies in the microbial culture medium.

On the other hand, the document data generating unit 155 may receive the result data RD. The document data generating unit 155 may generate document data PT corresponding to the result data RD based thereon. That is, the document data generating unit 155 may input the information included in the result data RD into a predetermined template, and generate document data PT corresponding to the image data ID received from the user device 200. Next, the document data generating unit 155 may transmit the outputted document data PT to the user device 200.

To summarize what has been described above with reference to FIG. 3, in a method for CFU recognition in accordance with an embodiment of the described technology, the server 100 receives captured image data ID from the user device 200 (S110).

Next, the server 100 preprocesses the received image data ID (S120). At this time, the preprocessing module 110 may generate preprocessed image data PD that has been re-sized, normalized, or filtered based on the image data ID received.

Next, the server 100 counts the number of CFUs included in the image by using the deep learning modules with respect to the preprocessed image data PD (S130).

Specifically, referring to FIG. 5, the server 100 receives the preprocessed image data PD and the pre-learned deep learning model TL (S131).

Next, the server 100 inputs the preprocessed image data PD into the deep learning model TL (S133).

Next, the server 100 calculates intermediate data MD composed of the output values of the deep learning model TL (S135). At this time, the deep learning model TL may receive the preprocessed image data PD as an input, and as an output thereof, may output count data FD or coordinate data CD. At this time, the values outputted from the deep learning model TL may be included in the intermediate data MD.

In addition, the server 100 may derive the intermediate data MD including a plurality of output values by inputting the preprocessed image data PD into the plurality of deep learning models TL.

Next, the server 100 selects result data RD from the intermediate data MD (S137). At this time, the server 100 may select an optimal value out of the plurality of output values included in the intermediate data MD.

Next, the server 100 may transmit the result data RD to the document data generating unit 155.

Next, referring back to FIG. 3, the server 100 inputs the result data RD including the number of CFUs counted into a predetermined template and electronically documents it (S140).

Next, the server 100 transmits document data (PT) that has been electronically documented or the result data RD to the user device 200 (S150).

Through this, the method for CFU recognition of the described technology can increase the accuracy and integrity of CFU counting by comparing the results of the plurality of different deep learning models with each other.

Moreover, the method for CFU recognition of the described technology can shorten the time needed to organize the result data into a document by automating the process of inputting the result data including the number of CFUs counted into a template and electronically documenting them. Through this, the described technology can process a large amount of experimental data quickly, shorten the time required for the experiment, and consequently improve the convenience for users.

In the following, a learning step of the deep learning models used in the method for CFU recognition in accordance with an embodiment of the described technology will be discussed in greater detail.

Figure 7:
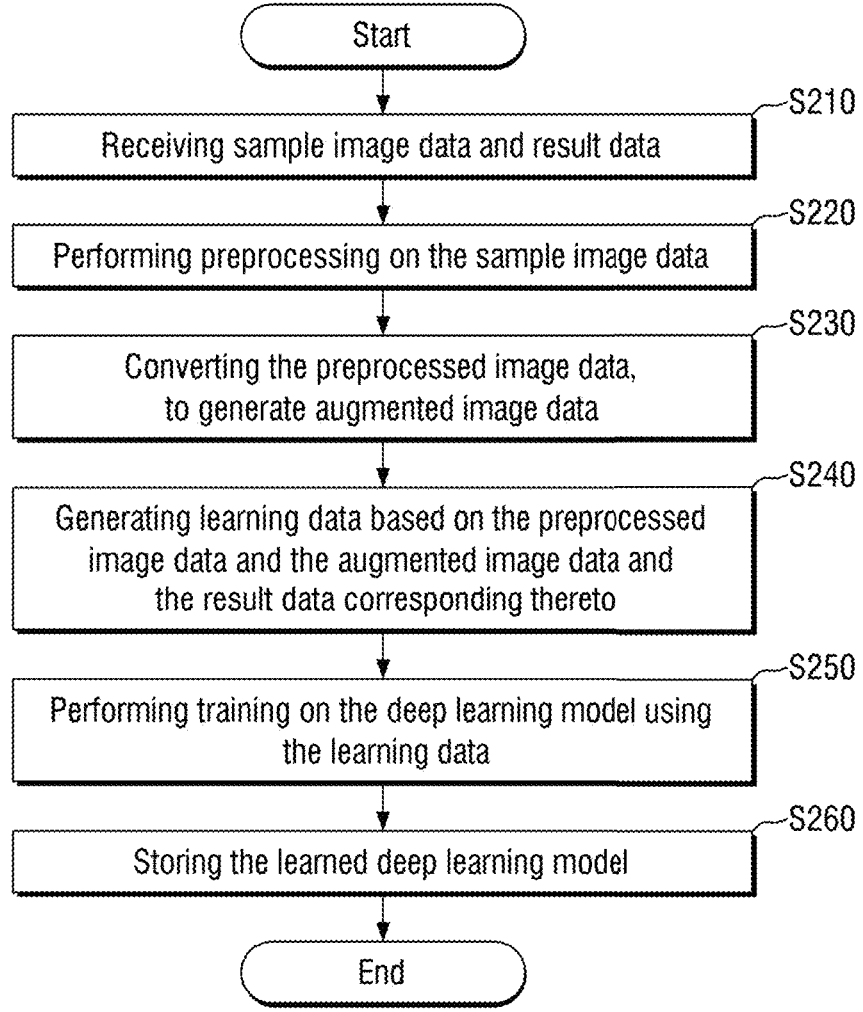
FIG. 7 is a flowchart for illustrating the learning step of the deep learning model of FIG. 6.
Figure 8:
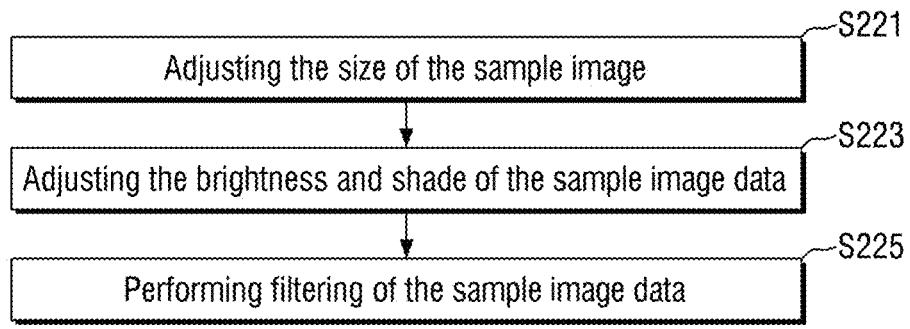
FIG. 8 is a flowchart for illustrating a preprocessing step for image data of FIG. 7.
Figure 9:
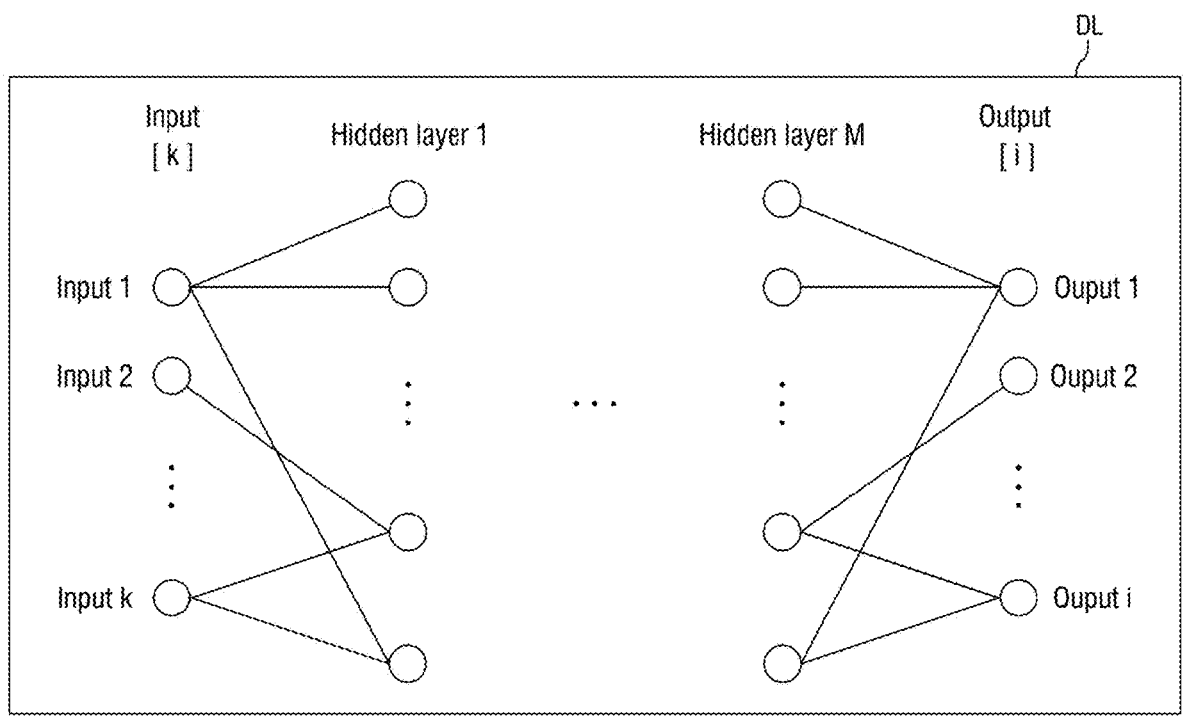
FIG. 9 is a diagram illustratively showing the configuration of the deep learning model of FIG. 6.

FIG. 6 is a block diagram for illustrating a learning step of the deep learning model in the method for CFU recognition in accordance with an embodiment of the described technology. FIG. 7 is a flowchart for illustrating the learning step of the deep learning model of FIG. 6. FIG. 8 is a flowchart for illustrating a preprocessing step for image data of FIG. 7. FIG. 9 is a diagram illustratively showing the configuration of the deep learning model of FIG. 6. In the following, the contents overlapping with what has been described above will be omitted or described briefly, and a description will be provided mainly around the differences.

Referring to FIGS. 6 and 7, in the learning step of the deep learning model used in the method for CFU recognition in accordance with an embodiment of the described technology, the preprocessing module 110 receives sample image data SD and result data RD (S210). At this time, the sample image data SD may be the data corresponding to image data ID, and the result data RD may include the number of CFUs counted of the sample image data SD.

Next, the preprocessing module 110 performs preprocessing on the sample image data SD inputted (S220).

For example, referring to FIG. 8, the size adjustment unit 111 adjusts the size of the sample image data SD (S221). Next, the normalization unit 113 adjusts the brightness and shade of the sample image data SD (S223). Next, the image filtering unit 115 performs filtering of the sample image data SD (S225).

In this case, although steps S221 to S225 are illustrated in FIG. 8 as being sequential, the described technology is not limited thereto. In other words, the order of steps S221 to S225 may be opposite to that in FIG. 8, and steps S221 to S225 may be performed in parallel.

In addition, steps S221 to S225 are illustrated in FIG. 8, but not all steps are necessarily performed. That is, only step S221 may be performed, or only step S225 may be performed. However, this is merely an example, and the described technology is not limited thereto.

Next, referring back to FIGS. 6 and 7, the data augmentation module 120 transforms the preprocessed image data PD, to thereby generate augmented image data AD (S230). At this time, the data augmentation module 120 may generate a plurality of augmented image data AD by using one or more image transformation processes based on the preprocessed image data PD.

For example, the data augmentation module 120 may rotate the preprocessed image data PD, to thereby generate the augmented image data AD. However, this is merely an example, and the data augmentation module 120 may generate the augmented image data AD through a transformation process of various methods.

Next, the database module 130 generates learning data TD, based on the preprocessed image data PD and the augmented image data AD and the result data RD corresponding thereto (S240). In this case, the learning data TD may include the preprocessed image data PD and the augmented image data AD, and the result data RD corresponding thereto. The learning data TD generated may be stored in the information collection unit 131.

Next, the learning module 140 performs training on the deep learning models DL using the learning data TD (S250). In this case, the deep learning models DL may be stored and used in the deep learning memory unit 133 of the database module 130.

The learning module 140 may receive the learning data TD as input, and based on this, subject the deep learning models DL to learning. For example, the learning module 140 may subject the deep learning models DL to learning, by applying the preprocessed image data PD or augmented image data AD to the input nodes of the deep learning models DL and inputting the result data RD including the number of CFUs counted into the output nodes.

Next, the database module 130 stores the learned deep learning models TL therein (S260). In this case, the server 100 may store the plurality of learned deep learning models TL in the deep learning memory unit 133 based on the learning data TD stored in the information collection unit 131.

Additionally, referring to FIG. 9, the deep learning model DL may include an input layer that uses image data ID or augmented image data AD as an input node, an output layer that uses count data FD or coordinate data CD as an output node, and M hidden layers arranged between the input layer and the output layer.

Here, weights may be set for the edges that connect the nodes of the respective layers. These weights or the presence or absence of the edges may be added, removed, or updated during the learning process. Therefore, weights of nodes and edges arranged between k input nodes and i output nodes may be updated through the learning process.

Before the deep learning model DL performs learning, all nodes and edges may be set to initial values. However, if information is inputted cumulatively, the weights of the nodes and edges may be changed, and matching may be made between parameters inputted as learning factors (i.e., image data) and values assigned to output nodes (i.e., count data or coordinate data) in this process.

Additionally, if a cloud server (not shown) is utilized, the deep learning models DL may receive and process a large number of parameters. Therefore, the deep learning models DL may perform learning based on an immense amount of data.

The weights of the nodes and edges between the input and output nodes constituting the deep learning models DL may be updated by the learning process of the deep learning models DL. Moreover, the parameters outputted from the deep learning models DL may be further expanded to various data, in addition to the count data FD or the coordinate data CD, as a matter of course.

In the following, a performance step of the deep learning models used in the method for CFU recognition in accordance with an embodiment of the described technology will be discussed in detail.

Figure 10:
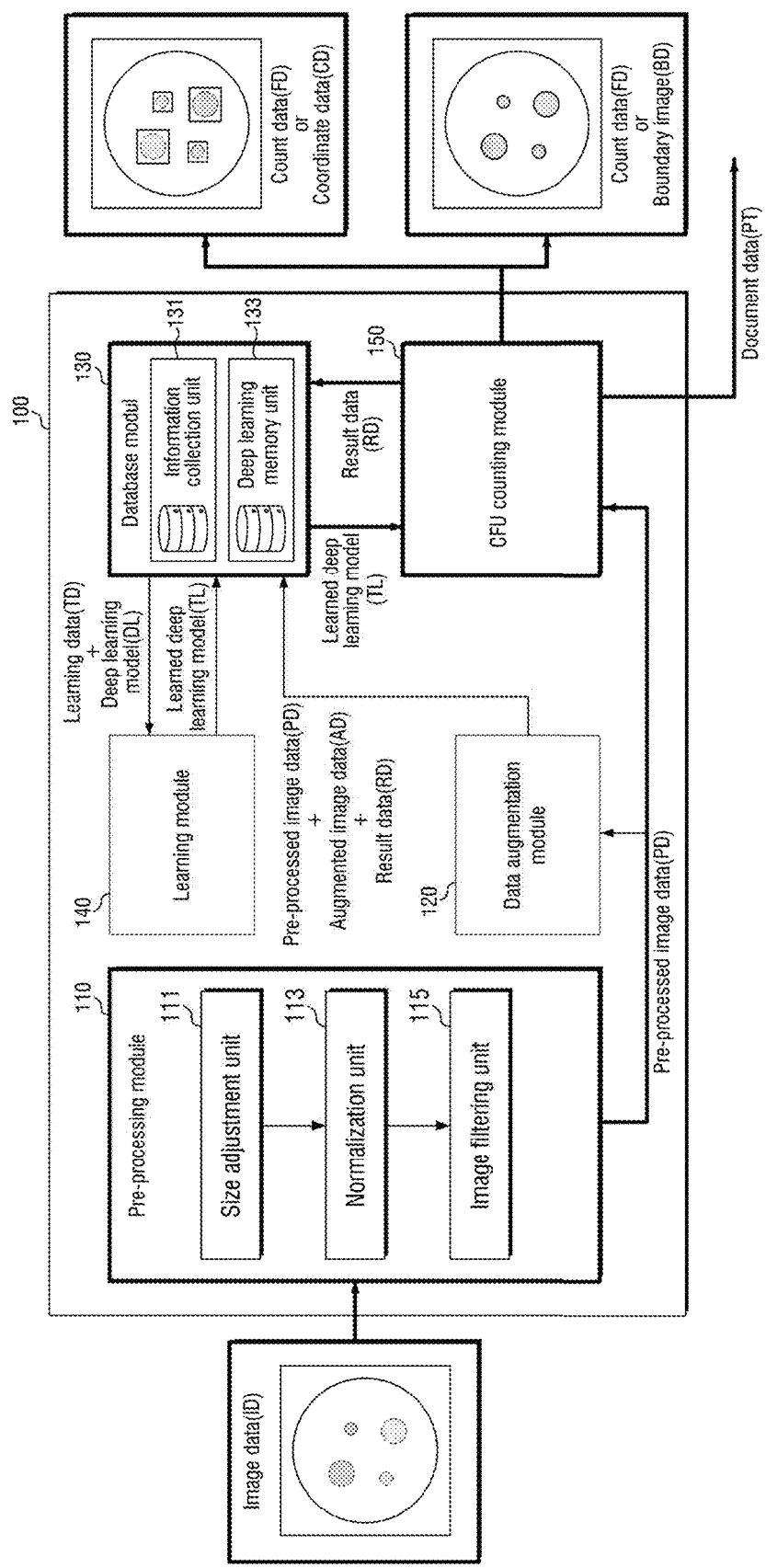
FIG. 10 is a block diagram for illustrating a performance step of a deep learning model in a method for CFU recognition in accordance with an embodiment of the described technology.
Figure 11:
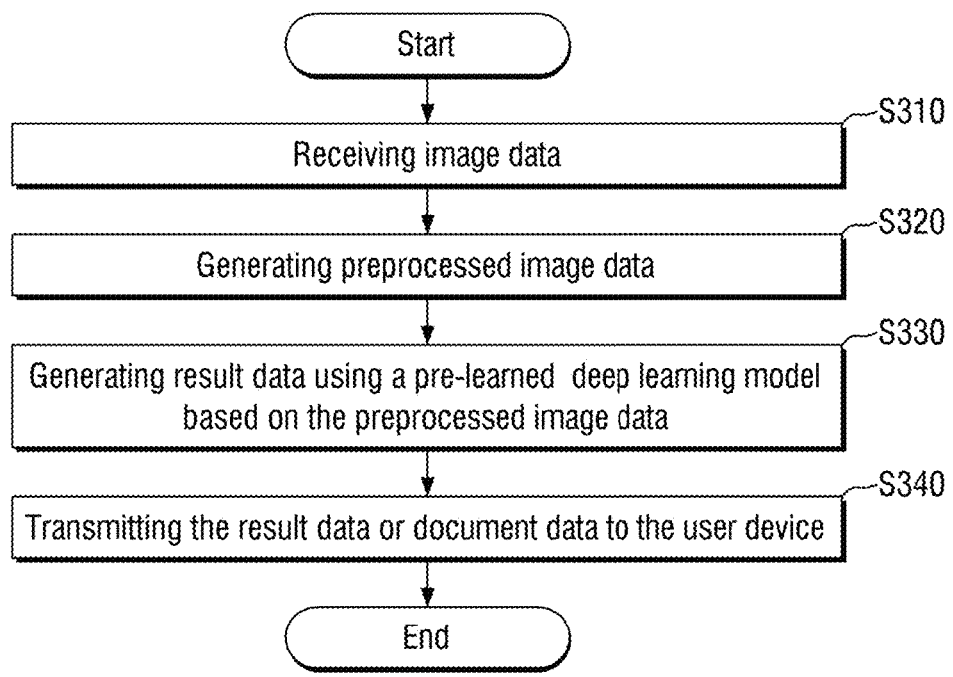
FIG. 11 is a flowchart for illustrating the performance step of the deep learning model of FIG. 10.

FIG. 10 is a block diagram for illustrating a performance step of deep learning models in a method for CFU recognition in accordance with an embodiment of the described technology. FIG. 11 is a flowchart for illustrating the performance step of the deep learning models of FIG. 10. Likewise, in the following, the contents overlapping with what has been described above will be omitted or described briefly, and a description will be provided mainly around the differences.

Referring to FIGS. 10 and 11, the preprocessing module 110 receives image data ID (S310).

Next, the preprocessing module 110 generates preprocessed image data PD based on the image data ID received (S320).

Next, the CFU counting module 150 generates result data RD using a pre-learned deep learning model TL based on the preprocessed image data PD (S330). At this time, the CFU counting module 150 derives a CFU counting value using one or more deep learning models TL stored in the deep learning memory unit 133. If a plurality of deep learning models TL is used, the final CFU counting value may be selected by comparing a plurality of CFU counting values with each other.

Next, the CFU counting module 150 inputs the result data RD into a predetermined template and generates document data PT (S340).

Next, the CFU counting module 150 transmits the result data RD or document data PT to the user device 200 (S350). In this case, the type and form of the result data RD or document data PT to be received by the user device 200 may be selected by the user. In this case, the user may determine the type of data to be received through preset settings.

For example, the user device 200 may receive count data FD or coordinate data CD, or may receive count data FD or boundary data BD. Also, however, this is merely an example, and the described technology is not limited thereto.

In the following, the result data RD or document data PT received by the user device 200 will be described by way of an example.

FIG. 12 is a diagram for illustrating result data in accordance with some embodiments of the described technology.

Referring to FIG. 12, the result data RD may include at least one of count data FD, coordinate data CD, and boundary data BD. In this case, the result data RD may be classified into various types according to the type of output data of the deep learning models.

For example, if the result data RD is of type 1, the output value of the deep learning model may be the count data FD, and the result data RD outputted to the user device 200 may include the count data FD and the boundary image BD. Here, the boundary image BD may be generated by the preprocessing module 110 described above.

Next, the boundary image BD may be displayed overlapping on the captured image data ID on the screen of the user device 200. In addition, the count data FD derived based on the image data ID may be displayed on the screen.

As another example, if the result data RD is of type 2, the output value of the deep learning model may be the coordinate data CD, and the result data RD outputted to the user device 200 may include the coordinate data CD. Here, the coordinate data CD may be a set of datasets including an x-axis, a y-axis, an x-axis size, and a y-axis size.

Next, a bounding box BB created based on the coordinate data CD may be displayed overlapping on the captured image data ID on the screen of the user device 200.

However, this is merely an example, and the interface displayed on the user device 200 may be modified and implemented in various ways, as a matter of course.

In the following, an example of an interface provided by the described technology displayed on the screen of the user device 200 will be described.

Figure 13:
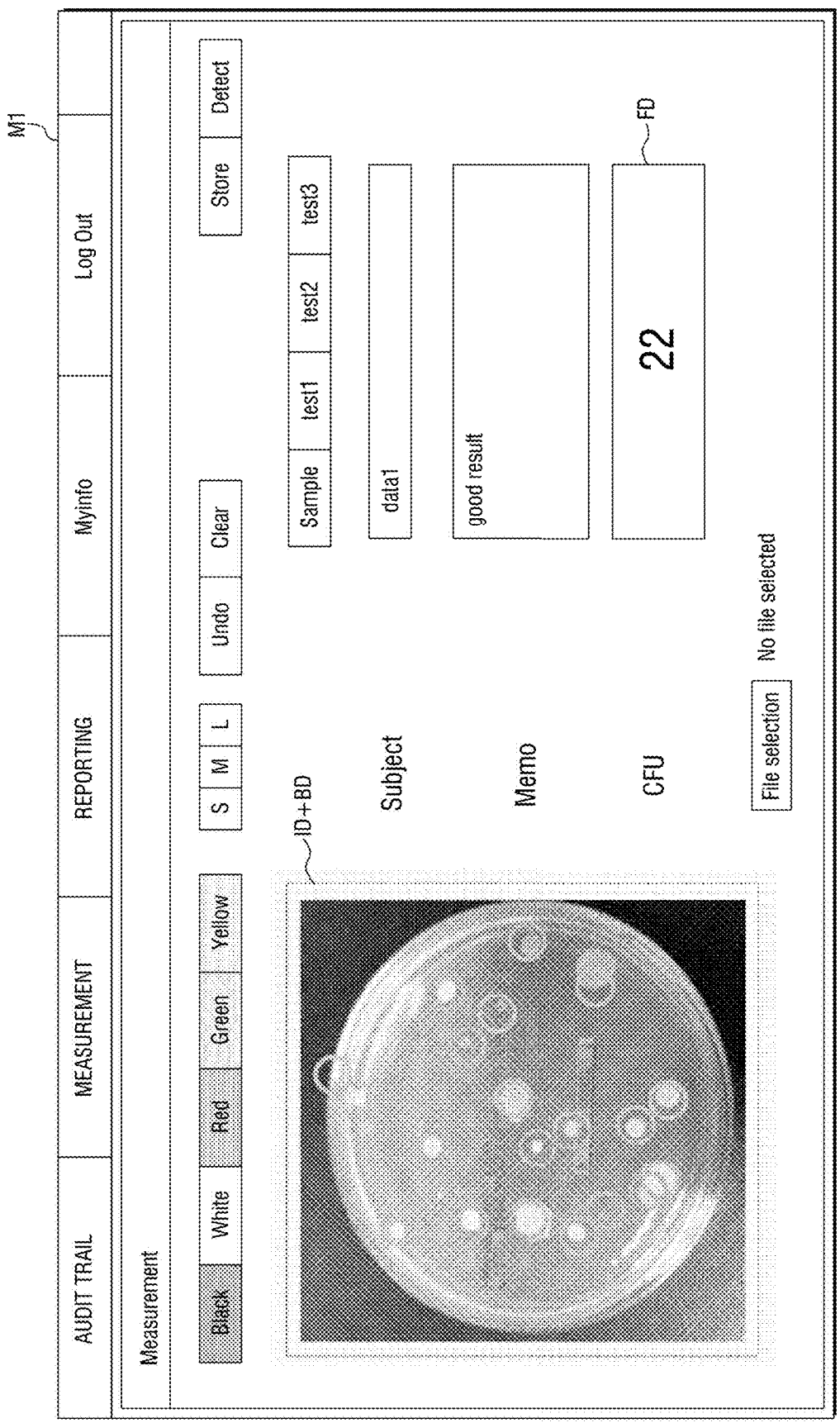
FIG. 13 is an exemplary view of an interface screen displaying result data of the described technology.
Figure 14:
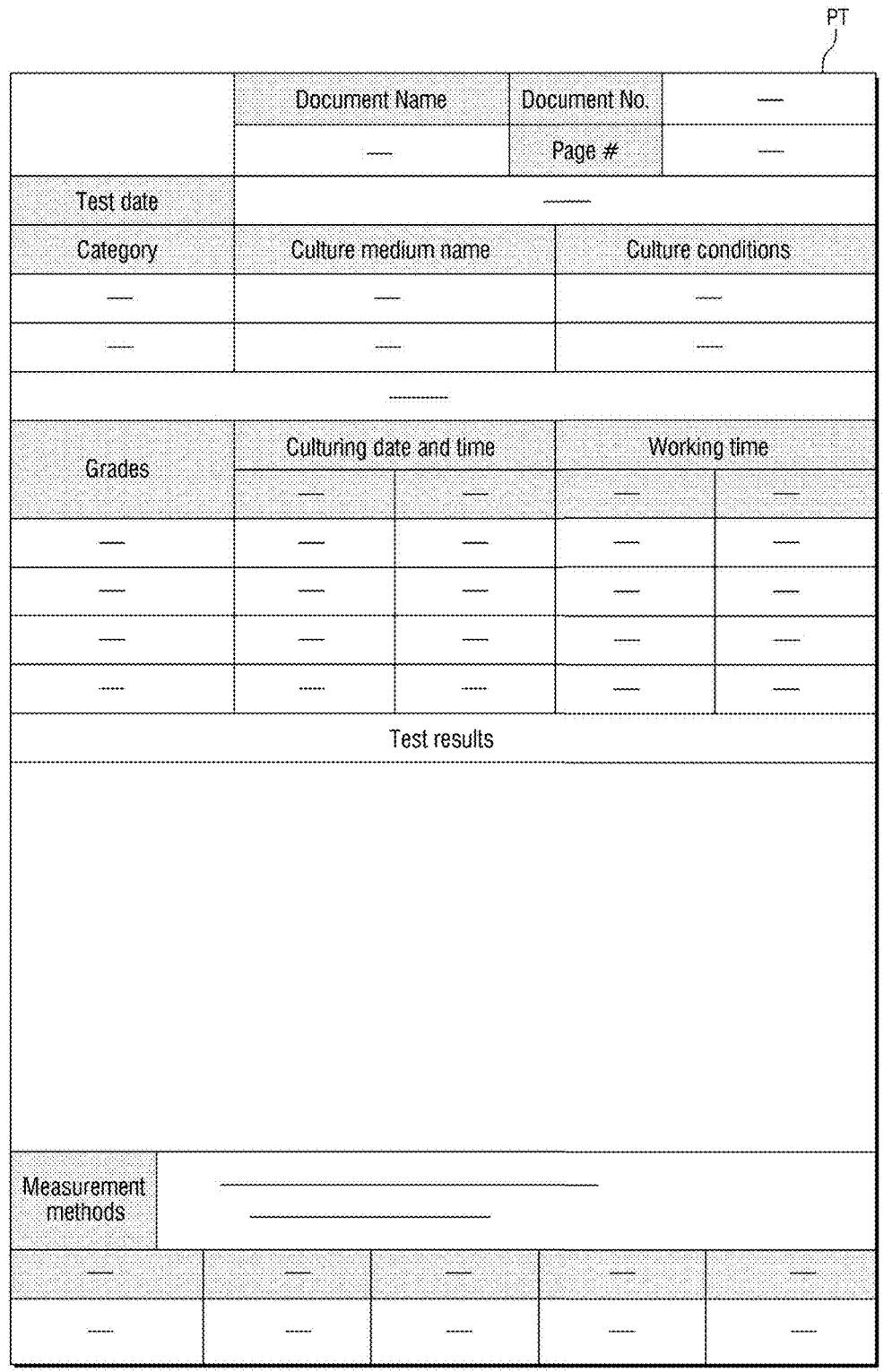
FIG. 14 is an exemplary view of an interface screen for illustrating document data of the described technology.

FIG. 13 is an exemplary view of an interface screen displaying result data of the described technology. FIG. 14 is an exemplary view of an interface screen for illustrating document data of the described technology;

First, referring to FIG. 13, the server 100 may display the result data RD corresponding to the image data ID received from the user device 200 on the screen of the user device 200.

For example, the boundaries of the colonies included in the boundary data BD may be displayed overlapping on the image data ID on the screen M1 of the user device. The boundaries of the colonies may be displayed using the boundary image BD received from the server 100, or may be displayed using a bounding box BB formed based on a dataset included in the coordinate data CD.

In addition, buttons that allow colors, sizes, etc. that differentiate respective colonies to be classified and displayed differently may be provided on one side of the screen, and the type of sample used in the microbial culture medium, the experiment title, notes, the count data FD for the image data ID displayed on the screen, etc. may be displayed. However, this is merely an example, and the described technology is not limited thereto.

In addition, referring to FIG. 14, the server 100 may derive result data RD based on the image data ID received from the user device 200, and form and display document data PT based on the derived result data RD on the screen of the user device 200.

The document data PT may be formed using a predetermined template, and each data included in the result data RD may be arranged in different areas of each document data and automatically inputted.

Through this, the method for CFU recognition of the described technology can shorten the time needed to organize the result data into a document by automating the process of inputting the result data including the number of CFUs counted into a template and electronically documenting them. Therefore, the described technology can process a large amount of experimental data quickly, shorten the time required for the experiment, and consequently improve the convenience for users.

Figure 15:
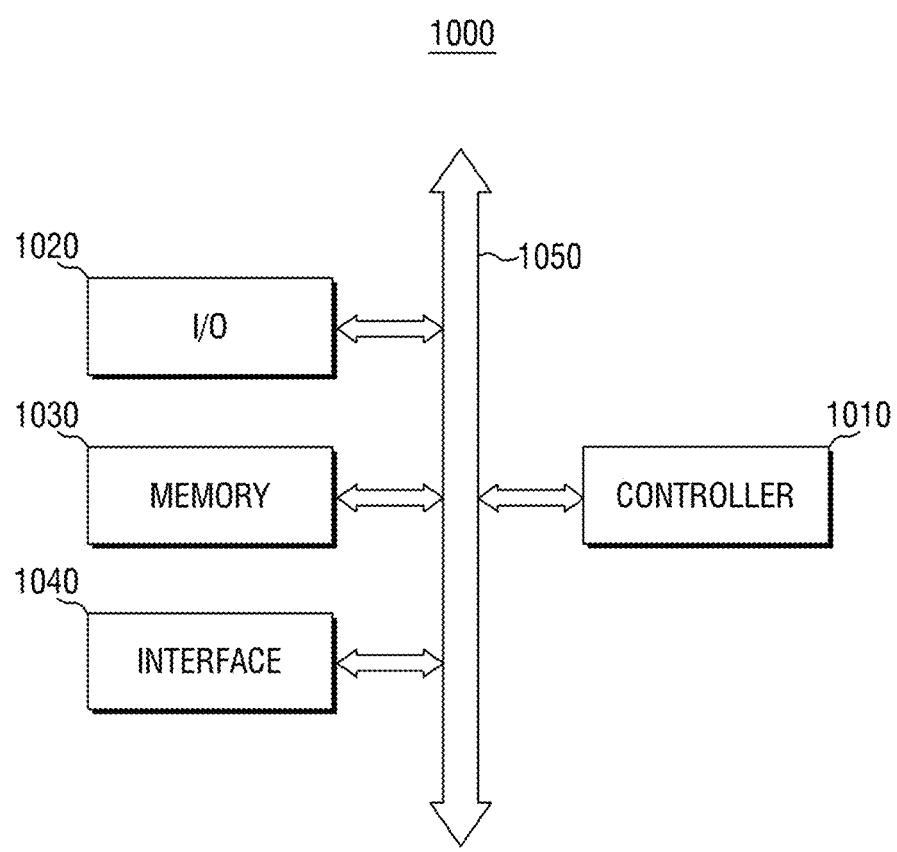
FIG. 15 is a diagram for illustrating a system for performing a method for CFU recognition in accordance with some embodiments of the described technology.

FIG. 15 is a diagram for illustrating a system for performing a method for CFU recognition in accordance with some embodiments of the described technology.

Referring to FIG. 15, the CFU recognition server 100 in accordance with some embodiments of the described technology described above may be implemented as an electronic device 1000. The electronic device 1000 may include a controller 1010, an input/output device (I/O) 1220, a memory device 1230, an interface 1040, and a bus 1250. The controller 1010, the input/output device 1020, the memory device 1030, and/or the interface 1040 may be coupled to each other via the bus 1050. The bus 1050 corresponds to a path through which data is moved.

Specifically, the controller 1010 may include at least one of a CPU (central processing unit), an MPU (microprocessor unit), an MCU (microcontroller unit), a GPU (graphic processing unit), a microprocessor, a digital signal processor, a microcontroller, an application processor (AP), and logic devices capable of performing functions similar thereto.

The input/output device 1020 may include at least one of a keypad, a keyboard, a touch screen, and a display device. The memory device 1030 may store data and/or a program, etc.

The interface 1040 may perform the function of transmitting data to a communication network or receiving data from the communication network. The interface 1040 may be of the form wired or wireless. For example, the interface 1040 may include an antenna or a wired/wireless transceiver. Although not shown, the memory device 1030 may be a working memory for improving the operation of the controller 1010, which may further include a high-speed DRAM and/or SRAM, etc. The memory device 1030 may store a program or an application therein.

Alternatively, the server 100 in accordance with embodiments of the described technology may be a system formed by a plurality of electronic devices 1000 being connected to each other via a network. In such a case, each module or combinations of modules may be implemented with an electronic device 1000. However, the present embodiment is not limited thereto.

Additionally, the server 100 may be implemented with at least one of a workstation, a data center, an Internet data center (IDC), a direct-attached storage (DAS) system, a storage area network (SAN) system, a network-attached storage (NAS) system, and a RAID (redundant array of inexpensive disks, or redundant array of independent disks) system, but the present embodiment is not limited thereto.

Also, the server 100 may transmit data through a network using the user device 200. The network may include a network based on wired Internet technology, wireless Internet technology, and short-range communication technology. The wired Internet technology may include, for example, at least one of a local area network (LAN) and a wide area network (WAN).

The wireless Internet technology may include at least one of, for example, wireless LAN (WLAN), DMNA (Digital Living Network Alliance), WiBro (Wireless Broadband), WiMAX (World Interoperability for Microwave Access), HSDPA (High Speed Downlink Packet) Access), HSUPA (High Speed Uplink Packet Access), IEEE 802.16, LTE (Long Term Evolution), LTE-A (Long Term Evolution-Advanced), WMBS (Wireless Mobile Broadband Service), and 5G NR (New Radio) technology. However, the present embodiment is not limited thereto.

The short-range communication technology may include at least one of, for example, Bluetooth, RFID (Radio Frequency Identification), IrDA (Infrared Data Association), UWB (Ultra-Wideband), ZigBee, NFC (Near Field Communication), USC (Ultra Sound Communication), VLC (Visible Light Communication), Wi-Fi, Wi-Fi Direct, and 5G NR (New Radio). However, the present embodiment is not limited thereto.

The server 100 communicating over the network may comply with technical standards and standard communication methods for mobile communication. For example, the standard communication methods may include at least one of GSM (Global System for Mobile communication), CDMA (Code Division Multiple Access), CDMA 2000 (Code Division Multiple Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTEA (Long Term Evolution-Advanced), and 5G NR (New Radio). However, the present embodiment is not limited thereto.

In summary, the method for CFU recognition of the described technology may perform CFU counting using a pre-learned deep learning model. As a result, the described technology can increase the accuracy of CFU counting and reduce the time required for CFU recognition. In addition, the method for CFU recognition of the described technology can increase the accuracy and integrity of CFU counting by comparing the results of a plurality of different deep learning models with each other.

The above description is merely an illustrative description of the technical idea of the present embodiments, and those of ordinary skill in the art to which the present embodiments pertain will be able to make various modifications and variations without departing from the essential characteristics of the embodiments. Therefore, the present embodiments are not intended to limit the technical idea of the present embodiments but to describe it, and the scope of the technical idea of the present embodiments is not limited by these embodiments. The scope of protection of the present embodiments should be construed by the accompanying claims, and all technical ideas within the scope equivalent thereto should be construed as being included in the scope of the present embodiments.

What is claimed is:

1. A method for processing image data of a microbial culture medium to recognize colony forming unit (CFU), the method comprising:
    subjecting, at a processor, a plurality of deep learning models to learning to generate a plurality of pre-learned deep learning models;
    receiving, at the processor, captured image data of the microbial culture medium from a user device;
    preprocessing, at the processor, the captured image data, the preprocessing comprising one or more of:
        adjusting a size of the captured image data,
        adjusting a brightness and shading of the captured image data to be within a predetermined range, or
        filtering the captured image data using a filter stored in a memory;
    counting, at the processor, the number of CFUs included in the preprocessed image data using the plurality of pre-learned deep learning models, the counting comprising:
        receiving the plurality of pre-learned deep learning models,
        inputting the preprocessed image data into the plurality of pre-learned deep learning models, and deriving respective intermediate data for the plurality of pre-learned deep learning models, and
        comparing the respective intermediate data with each other and deriving result data, the result data including the counted number of CFUs, wherein the comparing comprises:
            determining whether result values outputted from the plurality of learned deep learning models are all identical or different from one another, and
            in response to the respective result values being different from one another, selecting a result value that satisfies a preset condition and deriving the result value as the result data;
    automatically inputting information included in the result data into a predetermined template to generate document data corresponding to the captured image data; and
    transmitting at least one of the result data or the document data to the user device,
    wherein the subjecting comprises:
        generating augmented image data by using one or more image transformation processes, based on the preprocessed image data; and
        subjecting the plurality of deep learning models to learning by using learning data including the augmented image data to generate the plurality of pre-learned deep learning models.

2. The method of claim 1, wherein the result data comprises at least one of the following:
    count data obtained by counting the counts of colonies formed in the microbial culture medium;
    coordinate data indicating locations where the colonies are formed in the microbial culture medium; or
    boundary data indicating boundaries of the colonies in the microbial culture medium.

3. The method of claim 2, wherein the plurality of pre-learned deep learning models receive the preprocessed image data as an input, and provide the count data or the coordinate data as an output thereof.

4. The method of claim 3, wherein each of the plurality of pre-learned deep learning models comprises:
    an input layer that uses the preprocessed image data as an input node;
    an output layer that uses the count data or the coordinate data as an output node; and
    one or more hidden layers arranged between the input layer and the output layer, and
    wherein weights of nodes and edges between the input node and the output node are updated by a learning process of the plurality of pre-learned deep learning models.

5. The method of claim 2, further comprising one or more of the following:
    overlapping boundaries of the colonies included in the boundary data onto the image for the microbial culture medium, and displaying them on a screen of the user device; or
    overlapping a bounding box created based on the coordinate data onto the image for the microbial culture medium, and displaying it on the screen of the user device.

6. The method of claim 1, further comprising:
    wherein the subjecting further comprises:
    receiving the result data corresponding to the captured image data for learning; and
    subjecting the plurality of deep learning models to learning by using learning data including the preprocessed image data for learning, the augmented image data and the result data to generate the plurality of pre-learned deep learning models.

7. The method of claim 6, further comprising:
    storing the learning data in an information collection memory; and
    storing the plurality of pre-learned deep learning models in a deep learning memory,
    wherein the counting comprises:
    deriving the number of the CFUs using one or more of the plurality of pre-learned deep learning models stored in the deep learning memory.

8. The method of claim 6, wherein the one or more transformation processes comprise at least one of: rotation, inversion, symmetry, or transformation of the preprocessed image data.

9. A non-transitory computer readable medium storing instructions, when executed by one or more processors, the instructions configured to cause the one or more processors to perform the method of claim 1.

10. The non-transitory computer readable medium of claim 9, wherein the result data comprises at least one of the following:
    count data obtained by counting the counts of colonies formed in the microbial culture medium;
    coordinate data indicating locations where the colonies are formed in the microbial culture medium; or
    boundary data indicating boundaries of the colonies in the microbial culture medium.

11. The non-transitory computer readable medium of claim 10, wherein each of the plurality of pre-learned deep learning models comprises:
 an input layer that uses the preprocessed image data as an input node;
 an output layer that uses the count data or the coordinate data as an output node; and
 one or more hidden layers arranged between the input layer and the output layer, and
 wherein weights of nodes and edges between the input node and the output node are updated by a learning process of the plurality of pre-learned deep learning models.

12. The non-transitory computer readable medium of claim 10, wherein the method further comprises one or more of the following:
 overlapping boundaries of the colonies included in the boundary data onto the image for the microbial culture medium, and displaying them on a screen of the user device; or
 overlapping a bounding box created based on the coordinate data onto the image for the microbial culture medium, and displaying it on the screen of the user device.

13. The non-transitory computer readable medium of claim 10, wherein the method further comprises:
 wherein the subjecting further comprises:
 receiving the result data corresponding to the captured image data,
 wherein the one or more transformation processes comprise at least one of: rotation, inversion, symmetry, or transformation of the preprocessed image data; and
 subjecting the plurality of deep learning models to learning by using learning data including the preprocessed image data for learning, the augmented image data and the result data to generate the plurality of pre-learned deep learning models.

14. The non-transitory computer readable medium of claim 13, wherein the method further comprises:
 storing the learning data in an information collection memory; and
 storing the plurality of pre-learned deep learning models in a deep learning memory,
 wherein the counting comprises deriving the number of the CFUs using one or more of the plurality of pre-learned deep learning models stored in the deep learning memory.

15. A system for processing image data of a microbial culture medium to recognize colony forming unit (CFU), the system comprising:
 a processor configured to subject a plurality of deep learning models to learning to generate a plurality of pre-learned deep learning models;
 a preprocessing processor configured to receive and pre-process captured image data of the microbial culture medium from a user device, the preprocessing processor further configured to one or more of:
 adjust a size of the captured image data,
 adjust a brightness and shading of the captured image data to be within a predetermined range, or
 filter the captured image data using a filter stored in a memory; and
 a CFU counting processor configured to count the number of CFUs included in the preprocessed image data, the CFU counting processor further configured to:
 receive the plurality of pre-learned deep learning models;
 input the preprocessed image data into the plurality of pre-learned deep learning models, and derive respective intermediate data for the plurality of pre-learned deep learning models;
 compare the respective intermediate data with each other and derive result data, the result data including the counted number of CFUs, to perform the comparing, the CFU counting processor configured to:
 determine whether result values outputted from the plurality of pre-learned deep learning models are all identical or different from one another, and
 in response to the respective result values being different from one another, select a result value that satisfies a preset condition and deriving the result value as the result data;
 automatically input information included in the result data into a predetermined template to generate document data corresponding to the captured image data; and
 transmit at least one of the result data or the document data to the user device,
 the processor further configured to:
 generate augmented image data by using one or more image transformation processes, based on the preprocessed image data; and
 subject the plurality of deep learning models to learning by using learning data including the augmented image data to generate the plurality of pre-learned deep learning models.

16. The system of claim 15, wherein the result data comprises at least one of the following:
 count data obtained by counting the counts of colonies formed in the microbial culture medium;
 coordinate data indicating locations where the colonies are formed in the microbial culture medium; or
 boundary data indicating boundaries of the colonies in the microbial culture medium.

17. The system of claim 16, wherein the plurality of pre-learned deep learning models receive the preprocessed image data as an input, and provide the count data or the coordinate data as an output thereof.

18. The system of claim 16, further comprising a learning processor configured to:
 receive the result data corresponding to the captured image data; and
 subject the plurality of deep learning models to learning by using learning data including the preprocessed image data for learning, the augmented image data and the result data to generate the plurality of pre-learned deep learning models.

19. The system of claim 18, further comprising:
 an information collection memory configured to store the learning data; and
 a deep learning memory configured to store the plurality of pre-learned deep learning models,
 the CFU counting processor further configured to derive the number of the CFUs using one or more of the plurality of pre-learned deep learning models stored in the deep learning memory.

20. The system of claim 18, wherein the one or more transformation processes comprise at least one of: rotation, inversion, symmetry, or transformation of the preprocessed image data.

* * * * *